Oct. 26, 1943.    J. L. HIPPLE    2,332,720
TRACTOR-MOUNTED IMPLEMENT
Filed June 30, 1941    2 Sheets-Sheet 2
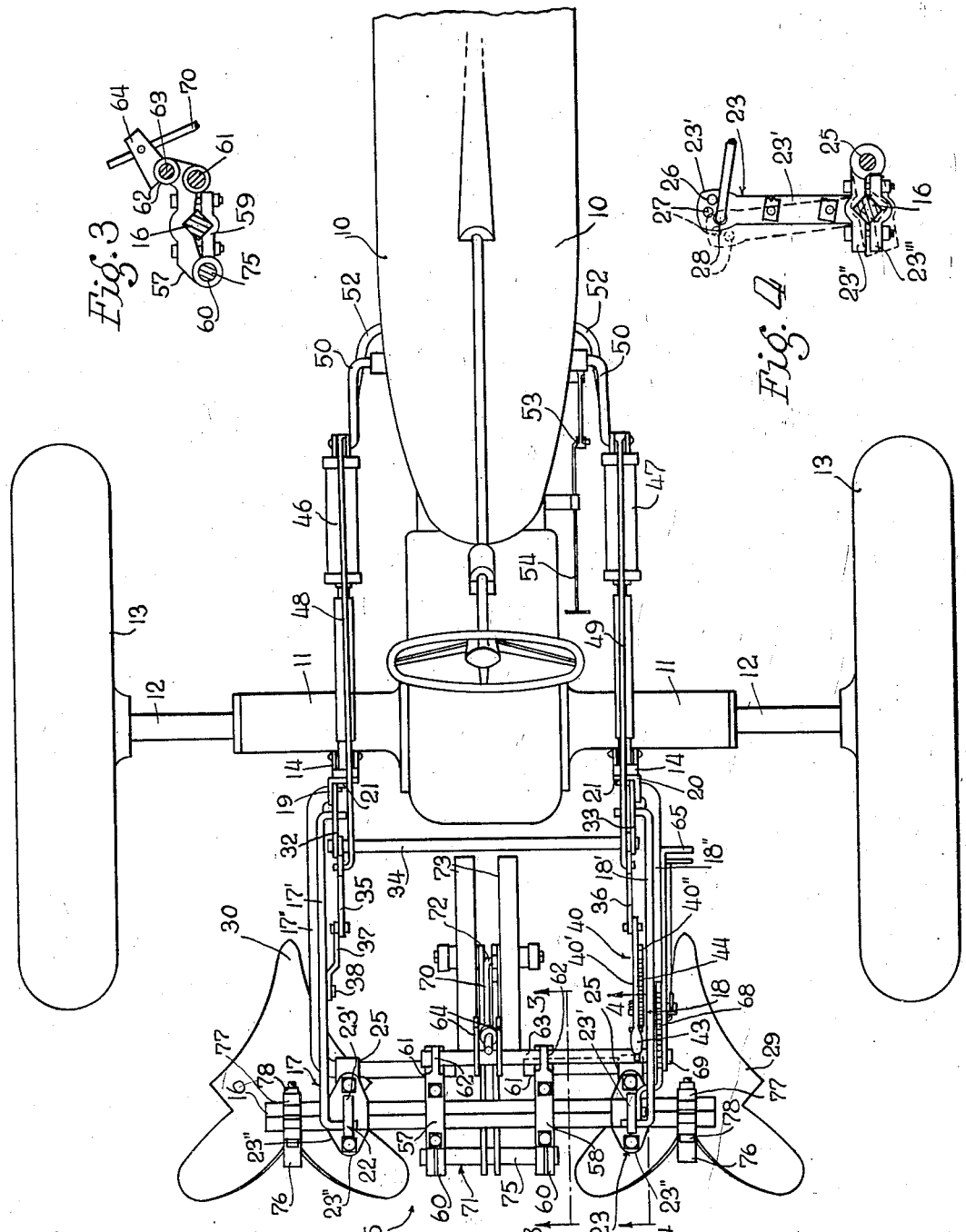
Inventor
James L. Hipple
By Paul O. Pippel
Atty.

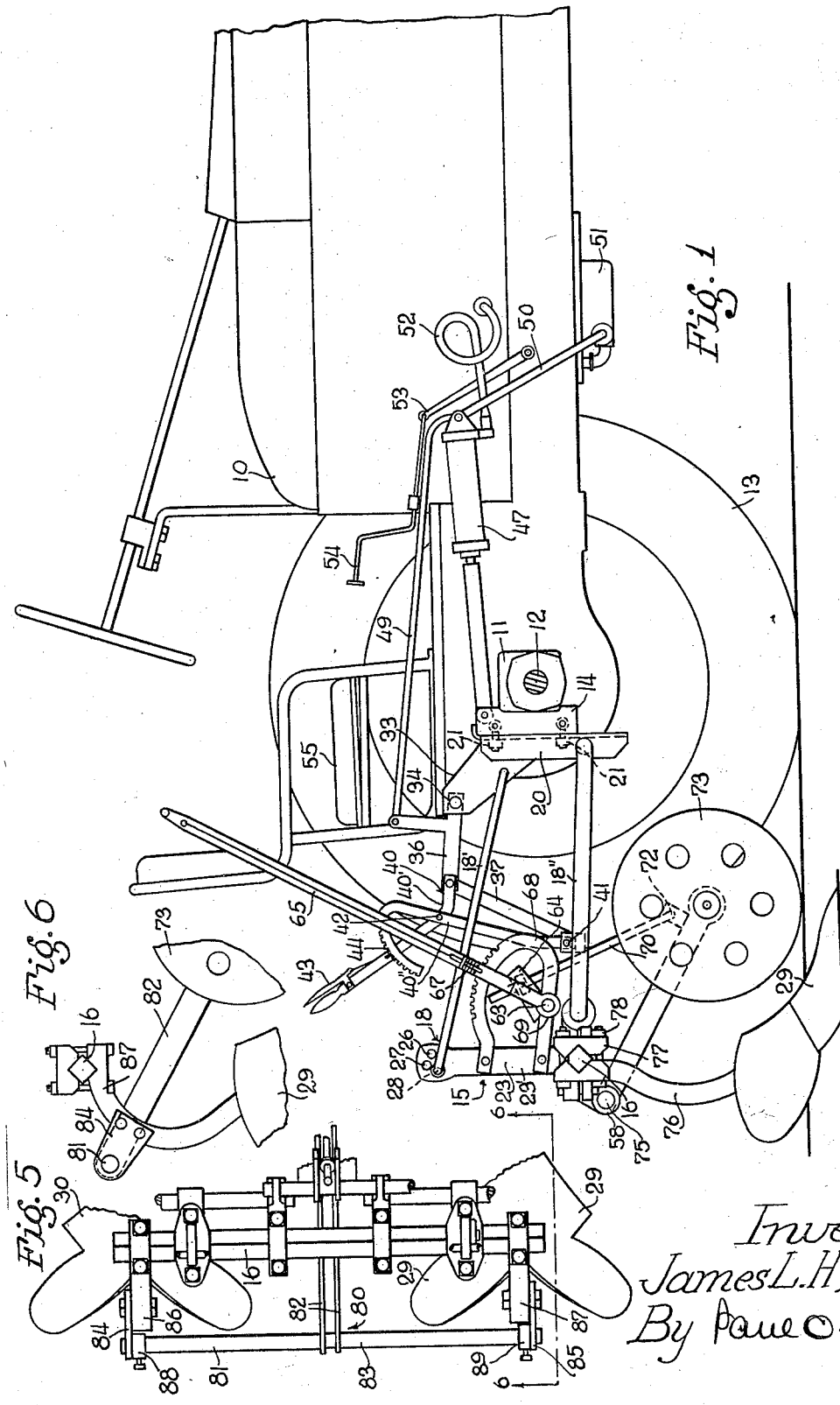

Patented Oct. 26, 1943

2,332,720

UNITED STATES PATENT OFFICE 2,332,720

TRACTOR-MOUNTED IMPLEMENT

James L. Hipple, Canton, Ill., assignor to International Harvester Company, a corporation of New Jersey Application June 30, 1941, Serial No. 400,369

7 Claims. (Cl. 97—47)

This invention relates to tractor-mounted ground-working implements.

The main object of the invention is to provide a novel ground-working implement adaptable for low clearance type of tractors.

Another object of the invention is to provide, in a tractor-mounted ground-working implement, pairs of vertically spaced links for connecting a transversely extending tool-supporting structure to the tractor for free vertical movement in its working position and which have an adjustment therein for varying the angle for penetration of a working tool carried by the supporting structure.

Another object is to provide in a tractor-mounted implement utilizing pairs of vertically spaced links for connecting the tool-supporting structure, means wherein the plow or working tool carried by the supporting structure can be laterally leveled with respect to the ground.

Still another object is to provide a novel means for the connection of gauge wheels with a tool-supporting frame having ground-working tools thereon.

According to the present invention, the tractor-mounted implement includes a tool-supporting structure adapted to extend transversely of the tractor and connectable to the tractor by means of laterally spaced pairs of vertically spaced links, the forward ends of the vertically spaced links being connected to a quick attachable frame means which serves as means for attaching the implement in its entirety to the tractor. On the tool-supporting structure there is provided a vertically extending bracket or member which serves as a means to which the spaced links at the rear ends are pivotally connected to the tool-supporting structure. In the upper end of this vertically extending bracket, there is provided a set of holes vertically and longitudinally arranged into which can be inserted the rear end of the upper link. As the end of the upper link is disposed in the different holes, the supporting structure takes a different angular position with respect to the lower link. The tool-supporting structure carries a tool, and when this adjustment is made the angle of penetration of the working tool into the ground is changed. Mounted on the frame means is a rock-shaft extending across the rear of the tractor and having arms extending rearwardly for connection with the rearward ends of the lower links. This rock-shaft serves as a stabilizer and as well a part of the lift means for raising the supporting structure and working tool out of its working position. When the tool is in its working position, the working depth is regulated by a centrally disposed gauge means, and since the connections of the stabilizer means are laterally disposed with respect to the gauge means, the rock-shaft will serve as means for stabilizing the tool-supporting frame laterally about the gauge means and prevents any tendency of lateral tilting of the tool-supporting frame. In the connection of one of the arms of the stabilizer with the lower connecting link, there is provided an adjustment whereby the tool-supporting frame and its tool may be laterally leveled with respect to the ground. The gauge means comprises a gauge wheel or element adapted for contact with the ground and a T-shaped means for connecting the gauge wheel to the tool-supporting frame. The gauge wheel is connected to the leg of the T-shaped member, and the lateral expanse of the T-shaped member serves as means for the connection of the same with the tool-supporting frame, the ends thereof being respectively disposed generally in bearings in laterally spaced brackets on the transverse tool-supporting frame. These same brackets on the tool-supporting frame may also serve as means for the support of a part of the gauge wheel adjusting means.

For other objects and for a detailed description of the features of the present invention, reference may be had to the following detailed description taken in connection with the accompanying drawings, in which:

Figure 1 is a view in elevation of a tractor with the tractor-mounted implement embodying the features of the present invention connected to the same;

Figure 2 is a plan view of the tractor and of the implement connected thereto;

Figure 3 is a detail view in elevation of the supporting bracket for the gauge means and taken along the line 3—3 of Figure 2;

Figure 4 is a detail view in elevation of the vertically extending member having the adjusting holes therein for the connection of the upper link and taken along the line 4—4 of Figure 2;

Figure 5 is a plan view of a portion of the implement but showing a modified construction of the gauge means; and Figure 6 is a detail view in elevation of the modified form of gauge means and taken along the line 6—6 of Figure 5.

Referring now to Figures 1 to 4, there is shown a tractor 10 having a transversely extending rear axle structure 11 from which extends the drive axles 12 for driving the tractor drive wheels 13.

On the rear axle structure 11 are provided portions 14 adapted for the attachment thereto of tractor-mounted implements. These portions extend vertically on the rear face of the axle structure and are channel shaped.

To these portions 14 of the tractor there is connected a tractor-mounted implement 15. This tractor-mounted implement includes a transversely extending tool-supporting frame or structure 16, connected by means of laterally spaced pairs 17 and 18, of vertically spaced connecting links which are connected at their forward ends to vertically extending attaching frame pieces 19 and 20 which in turn are rigidly fixed to the attaching portions 14 of the tractor by means of the usual swing bolts 21. The pair of links 17 on the left-hand side of the tractor includes an upper link 17' and a lower link 17'', while the pair of links on the right-hand side of the tractor includes an upper link 18' and a lower link 18''. The tool-supporting structure 16 is a transversely extending tool bar of square cross-section and has laterally spaced thereon and clamped thereto, the vertically extending brackets 22 and 23, serving respectively for the connection of the pairs of links 17 and 18. This bracket construction can be better viewed in Figure 4. Since the bracket constructions at each side of the implement are of similar construction, description will be made of only one of the constructions.

Referring particularly to Figure 4, it will be noted that the bracket structure 23 includes a vertically extending portion 23' and a clamping portion 23'' which is retained on the transverse tool bar by a clamp plate means 23'''. Each of the lower links 17' and 18' has a transversely extending portion. This portion is pivotally connected to the bracket 23, as indicated at 25. The upper links also have a transversely extending portion and they are pivotally connected to the upper end of the vertically extending portions of the bracket structure 23. In the upper end of these vertically extending portions is provided a set of vertically spaced holes 26, 27, and 28. A transversely extending portion of the upper links may be inserted into any one of these holes. If the upper links are connected to the holes 26 of the sets of holes, the tool-supporting structure 16 will be rocked rearwardly about the connection 25 with the lower links to assume the position shown in dotted in Figure 4. This adjustment will give to working tools 29 and 30, carried rigidly between the tool-supporting structure, a setting for use when the tools are being used in sandy land and where less peneration is desired. If the vertically extending portion of the bracket means is adjusted so that the rear ends of the upper links are disposed in the intermediate holes 27, the working tool will be adapted for use under normal plowing conditions. If the vertical portion of the bracket structure is adjusted so that the rear ends of the upper links are connected in the holes 28, as shown in full in Figure 4, the working tools will then be adjusted so that greater penetration may be had as when the plow is being used in dry, hard ground.

On each of the vertically extending frame members 19 and 20, there are, respectively, upwardly extending portions 32 and 33 in which there is journaled a rock-shaft or stabilizing member 34. Extending rearwardly from this rock-shaft 34 and rigidly connected thereto are lifting arms 35 and 36. From the arm 35 there etxends a lifting link 37 which is connected to the lower link 17'', as indicated at 38. Between the arm 36 and the lower link 18'', there is connected link means 40, the same being at the right-hand side of the tractor. The connection of the link means 40 with the lower link 18'' is at 41. The link means 40 includes two relatively adjustable parts 40' and 40'' pivotally connected to each other, as indicated at 42. The part 40' serves as a lever and has a latch mechanism 43 adapted to be connected and located over a quadrant 44 formed on the part 40''. It should, thus, be apparent that the link means 40 is adjustable. This adjustment is to effect leveling of the tool-supporting frame and its plows with respect to the tractor.

When it is desired to lift the tool-supporting frame to its transport position, the rock-shaft 34 is rocked by means of fluid pressure cylinders 46 and 47, located respectively on the left-hand and right-hand sides of the tractor. The cylinders are anchored against the portions 14 on the tractor and as their movable parts move forwardly, the rock-shaft 34 is rocked in a clockwise direction about their connections with the vertically extending portions 32 and 33 of the vertically extending pieces 19 and 20. This movement is effected by means of connecting links 48 and 49 for the respective cylinders 46 and 47 which are connected to arms extending at right angles with respect to the lifting arms 35 and 36 on the rock-shaft 34. The forward ends of the fluid cylinders are supported on supporting links 50, and fluid is delivered from a fluid reservoir 51 partly disposed within the body of the tractor for the delivery of fluid through hose couplings 52 to the cylinder device. The operation of the fluid cylinders is initiated by movement of a lever 53 forwardly which is effected by an operating element 54 accessible to an operator's station 55 on the transverse rear axle structure 11 of the tractor.

On the transverse tool bar structure 16 is connected a pair of gauge means supporting brackets 57 and 58, as shown particularly well in Figures 2 and 3. These brackets are retained in their fixed position on the transverse tool bar by clamping plate means 59, and in rear of the transverse tool bar 16 there are provided thereon journal portions 60. Forwardly of the transverse tool bar, these brackets have journal portions 61 into which the transverse portions 25 of the lower links extend. Also, the forward portions of the brackets 57 and 58 are provided with journal portions 62 in which there is journaled a shaft 63 having rigidly connected at a location between the brackets 57 and 58 an adjusting arm 64. The right end of the shaft 63 extends a considerable distance to the right and has connected to it a manual adjusting lever 65, the upper end of which is accessible to the operator's station 55. This operating lever is adapted to work over a quadrant 68 carried by the vertically extending bracket 23 and is latched in any location thereover by the latch mechanism 67. The quadrant 68 has a journal portion 69 for the outer end of the shaft 63. The arm 64 is connected by means of a link 70 with the leg end of a T-shaped member 71, as indicated at 72. This leg end of the T-shape member has connected to it a pair of gauge wheels or elements 73. These gauge wheels are arranged centrally of the implement and in transverse alinement with the working tools 29 and 30 to serve as means for regulating the working depth of these working tools. The T-shaped member has a laterally extending portion 75, the expanse of which is sufficient so that the respective ends of the same are journaled in the bearing portions 60 of the spaced brackets 57 and 58. As the operating lever 65 is moved either forwardly or rearwardly over the quadrant 68, the gauge wheel 73 will be adjusted with respect to the tool-supporting frame, the T-shaped connecting means for the same pivoting about the journal connection of the transversely extending portion 75 with the bearing portions 60. When it is desired to adjust the working tools for a greater plowing depth, the lever 65 is drawn rearwardly over the quadrant 68. When it is desired to increase the working depth, the lever 65 is moved rearwardly over the quadrant 68. The working tools 29 and 30 are carried by substantially vertically extending tool beams 76 which are respectively clamped to the tool bar structure 16 by clamping plates 77 and bolts 78. These tool beams 76 are respectively located on the outer ends of the tool bar structure and externally of the respective bracket structures 22 and 23. When the leveling means included in the link 40 is adjusted, the tool-supporting frame 16 and the working tools 29 and 30 will be tilted laterally about the centrally disposed gauge wheel 73, but the lateral stability of the implement in its working position is maintained by the stabilizing rock-shaft 34.

Referring now particularly to Figures 5 and 6, there is shown a modified construction of the T-shaped member for the connecting of the gauge wheel 73 with the tool-supporting frame 16. This T-shaped member is shown generally at 80 and has a longer leg portion 82 and a longer transverse portion 83 than that of the T-shaped member 71 already described. This T-shaped member is particularly adapted for connection to the tool-supporting frame where the bearing portions 84 and 85 are provided respectively on the tool beams 86 and 87 and the same being bowed rearwardly to a greater extent than the tool beams 76. This T-shaped member 81 is held against lateral displacement by the collars 88 and 89 which bear respectively against the bearing portions 84 and 85.

It should now be apparent that there has been provided in a ground-working implement, which includes vertically spaced links for the connection of the tool-supporting structure with the tractor, an adjustment whereby the angular relation of the vertically raised links may be changed with respect to each other so that the angle of penetration of the ground-working tools may be varied for different conditions of the ground. Also, it should be apparent that an arrangement has been provided for the connection of gauge wheels to the tool-supporting frame structure which is of simple construction, and that means is provided for leveling the tool frame laterally with respect to these centrally disposed gauge wheels.

While various changes may be made in the detailed construction of the present invention, it should be understood that such changes shall be within the spirit and scope of the present invention as defined in the appended claims.

What is claimed is:

1. In combination, a tractor, an implement adapted for attachment to the tractor, and including a ground-working tool-supporting structure arranged to extend transversely of the tractor, ground-working tools carried by the transverse tool-supporting structure in spaced relation transversely of the tractor, means for connecting the tool-supporting structure to the tractor including laterally spaced pairs of vertically spaced upper and lower links, each of the respective links having some lateral looseness in their connection with the tool-supporting structure and with the tractor, a depth-gauge unit in support of the tool-supporting structure at a portion between said tools, stabilizing means on the tractor connected to the implement at lateral spaced locations with respect to each other, and means in at least one of the connections for rendering the same adjustable, whereby a lateral leveling of the tool-supporting structure and of the working tool may be effected about said depth-gauge unit as a fulcrum.

2. In combination, a tractor, a ground-working implement adapted to be connected to the tractor and including a tool-supporting structure, means for connecting the tool-supporting structure to the tractor for substantially free vertical movement in the working position, ground-working tools, tool beams for carrying the respective ground-working tool arranged in laterally spaced relationship on the tool-supporting structure, a bearing member on each of the tool beams, gauge means for maintaining the working depth of the ground-working tools and comprising gauge wheels, a T-shaped member for connecting the gauge wheels to the tool beams in centrally disposed relation with respect to the ground-working tools, the gauge wheels being carried by the leg of the T-shaped member and the lateral expanse of the T-shaped member journaled at its respective ends in the bearing members on the respective tool beams, and means for adjusting the gauge means with respect to the working tools.

3. In combination, a tractor, spaced tool beams, each of which having ground-working tools thereon, means for connecting the tool beams to the tractor for substantially free vertical movement when the tools are in their ground-working position, a bearing member on each of the tool beams, gauge means maintaining the working depth of the ground working tools comprising a gauge element, a T-shaped member for connecting the gauge element to the tool beams, the gauge element being carried by the leg of the T-shaped member and in a centrally disposed relation with respect to the ground-working tools and the lateral expanse of the T-shaped member journaled at its respective ends in the bearing members on the respective tool beams, and means for adjusting the gauge means with respect to the working tools.

4. In a ground-working implement partially supported by a tractor for propelling the same; the combination of a tool-supporting structure extending transversely of the tractor, ground-working tools depending from said structure at respective positions spaced transversely of the tractor, a depth-gauge unit depending from said supporting structure at a position between said tools and constituting the sole support for said structure when the tools are in the ground-working position whereby said structure can be tilted upon said unit as a fulcrum incident to varying the relative depth of the tools, and means connected between said tractor and said tool-supporting structure and manipulative to react therebetween to selectively tilt said structure as aforesaid.

5. In a ground-working implement for propulsion by a tractor having an operator's station and implement lifting gear; the combination of a tool-supporting structure extending transversely of the tractor, ground-working tools depending from said structure at respective positions spaced transversely of the tractor, a depth-gauge unit depending from said structure at a position between said tools and constituting the sole support for said structure when the tools are in the ground-working position whereby the structure can be tilted upon said unit as a fulcrum to vary the relative elevation of the tools, distensibly adjustable lifting means for connection between said structure and said lifting gear at a position on said structure spaced laterally from the depth-gauge unit to transfer the weight of the structure from said unit onto the tractor pursuant to operation of the lifting gear, and control means operably connected with said lifting means and disposed for manipulation from said station to distensibly adjust said lifting means as an expedient for tilting said structure as aforesaid while said structure rests upon the gauge unit.

6. In a ground-working implement for propulsion by a tractor having an operator's station and implement lifting gear; the combination of a tool-supporting structure extending transversely of the tractor, ground-working tools depending from said structure at respective positions spaced transversely of the tractor, a depth-gauge unit depending from said structure at a position between said tools and constituting the sole support for said structure when the tools are in the ground-working position whereby the structure can be tilted upon said unit as a fulcrum to vary the relative elevation of the tools, lifting means respectively connected with portions of the structure spaced oppositely from the depth-gauge unit transversely of the tractor and connecting said portions with the lifting gear to adapt the latter to transfer the weight of said structure from said unit onto the tractor, one of said lifting means being adjustable to react between the tractor and said structure to tilt the latter as aforesaid upon said unit when the structure rests upon said unit, and control means manipulative to produce such adjustment of the lifting means and extending from said lifting means into convenient access from said station for such manipulation.

7. In a ground-working implement, the combination of a tool-supporting structure including laterally-spaced coaxial bearings; ground-working tools spaced laterally upon said structure more distantly than said bearings and upon opposite sides thereof; and a plural-wheel depth gauge unit for all of said tools, comprising a gauge arm having laterally-spaced bearing portions at one end respectively in journaled relation with the bearings on the tool-supporting structure, adjacent coaxial and axially spaced gauge wheels upon opposite lateral sides of said arm at its other end and rotatively mounted thereon, said wheels being cooperable with said arm to support the tool-supporting structure, and means for maintaining said arm and said wheels in various selective positions radially of said coaxial bearings to vary the elevation of said structure from the ground and thus selectively determine the depth of said tools.

JAMES L. HIPPLE.